INVENTOR.
WORTHINGTON C. LENT
BY
Christie, Parker & Hale
ATTORNEYS.

Dec. 9, 1969 W. C. LENT 3,483,336
DISABLING DEVICE FOR THE ALTERNATING-CURRENT
PATH OF A TWO-WIRE TRANSMISSION SYSTEM
Filed April 5, 1967 2 Sheets-Sheet 2

INVENTOR.
WORTHINGTON C. LENT
BY
Christie, Parker & Hale
ATTORNEYS.

United States Patent Office 3,483,336
Patented Dec. 9, 1969

3,483,336
DISABLING DEVICE FOR THE ALTERNATING-CURRENT PATH OF A TWO-WIRE TRANSMISSION SYSTEM

Worthington C. Lent, Whittier, Calif., assignor to Lear Siegler, Inc., Santa Monica, Calif., a corporation of Delaware Filed Apr. 3, 1967, Ser. No. 627,702
Int. Cl. H04b 3/20; H04m 9/08
U.S. Cl. 179—170.4 8 Claims

ABSTRACT OF THE DISCLOSURE

A gain disabling device for disabling a signal path in a transmission system to prevent self-oscillation and to avoid the possibility of cross-talk between lines at the frequency of oscillation. A sensing circuit for detecting the presence or absence of current in the lines with which the gain disabling circuit is associated is positioned in the lines. A circuit responsive to the sensing circuit either opens the path of circulating current that causes the oscillation or reduces the gain of the amplifiers in the path below the gain required for sustained oscillation while maintaining direct-current isolation between the direct-current portion of the circulating current path and the direct-current path of the two-wire lines.

BACKGROUND OF THE INVENTION

Field of the invention

This invention relates to a disabling device for use in two-wire transmission systems and is particularly useful when employed at the repeaters of the transmission system.

Two-wire transmission systems such as telecommunication systems include a plurality of pairs of wires grouped and placed in a common protective sheath. Oftentimes as many as six hundred pairs are placed within one sheath.

Because of the very close proximity of the pairs, there is a capacitance between the wires which provides a path for coupling between the pairs and presents a potential cross-talk problem or disturbance on one pair by a signal appearing on another pair. The cross-talk problem becomes particularly acute when repeaters are used because, during the idle condition, these repeaters are unterminated and can go into sustained self-oscillation and cause interference in adjacent pairs.

Repeaters are employed to overcome losses in lengthy telecommunication systems. In the repeaters there is generally a coupling network that may be balanced so that the signals may be amplified and transmitted through the repeaters without any cross-coupling or interference between the receiving and transmitting ends during the talking or active condition. These networks at the repeaters are designed to be balanced when the two-wire line is in use, and a signal source or utilization means is connected to both ends of the two-wire line. One of the most commonly employed coupling networks is a hybrid transformer with four pairs of terminals wherein a balancing network is placed across one pair of the terminals to match the input impedance presented by the source of signals or other equipment connected to the remote ends of the two-wire line.

However, when the two-wire line is idle and the equipment at one or both ends of the two-wire line has been dropped from the line the coupling networks in the repeater are unbalanced and currents can circulate within the repeater. Because of the amplifying function of the repeaters and the amplifiers therein, circulating currents may exist and may become self-oscillating and result in "singing." Thereafter, because of the capacitive coupling between adjacent two-wire lines cross-talk may occur.

SUMMARY OF THE INVENTION

In accordance with this invention a disabling service device is employed in each two-wire line of the transmission system to either open the path for the circulating current or to reduce the gain of the amplifiers at the repeaters below the gain required for sustained oscillations. The device is responsive to a circuit that senses the presence and absence of direct-current on the two-wire lines of the system, independent of the direction of current flow. Thereafter the oscillation and resultant cross-talk is prevented by disabling one or both of the amplifying circuits or effectively removing the circulating path to inhibit the circulating current.

The disabling device may be located at each repeater station which comprises two separate one-way alternating-current signal channels which include amplifiers. The repeater further includes a separate direct-current channel isolated from the two alternating-current channels to complete the path for the direct currents that are generally employed in two-wire telecommunication circuits. By monitoring the direct current in the direct-current channel, the condition of the two-wire telecommunication circuit is determinable.

When the two-wire circuit is in the idle condition there will be no current flowing in the direct-current channel, and this absence of current is used to activate a disabling or inhibiting circuit that effectively removes the conduction path through one or both of the alternating-current channels.

Brief description of the drawing

Further features and advantages of the present invention may be understood more fully upon consideration of the following specification and drawing, in which:

FIG. 3 is a detailed schematic diagram of the circulating current inhibiting circuit.

Description of the preferred embodiment

Figure 1:
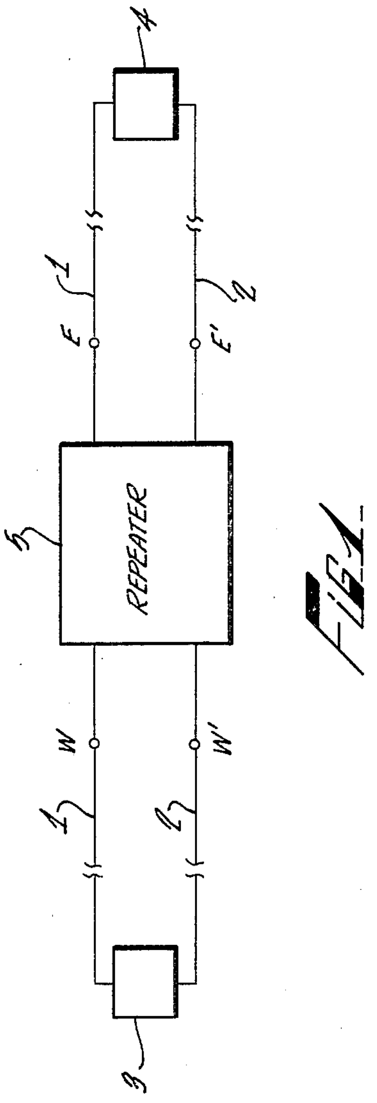
FIG. 1 is a block diagram of a two-wire telecommunication circuit.
Figure 2:
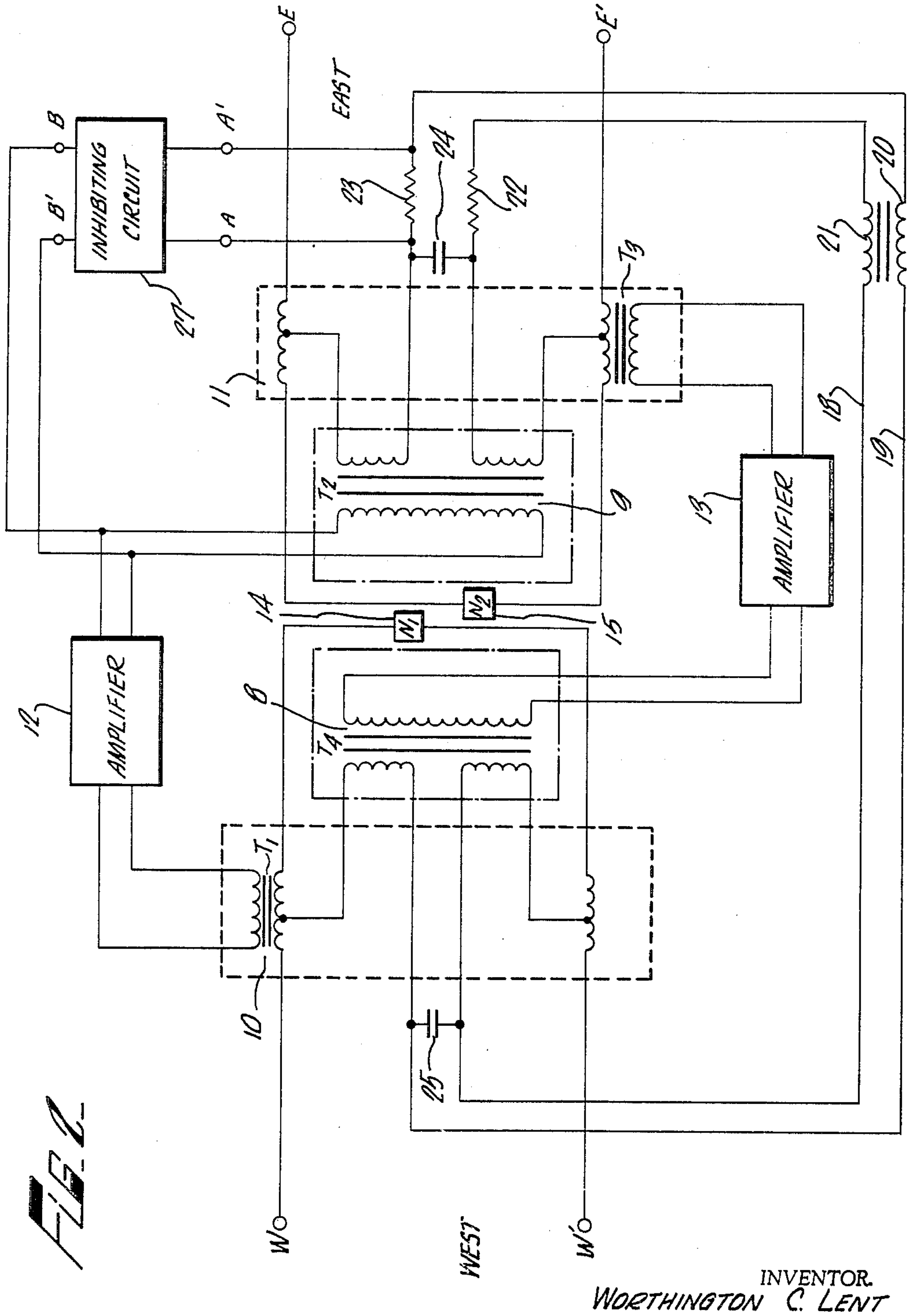

In FIG. 1 there is representatively shown a pair of transmission lines 1 and 2 coupling two remote stations 3 and 4 in a two-wire telecommunication circuit. Between the remote stations in the telecommunication circuit there is located a repeater 5. The repeater is employed to overcome circuit losses over the telecommunication circuit and to raise the transmitted energy in the circuit to acceptable levels.

The remote stations 3 and 4 may be, for example, a central office and a subscriber station in a telephone system, or some other similar equipment in a telecommunication system.

Figure 2:
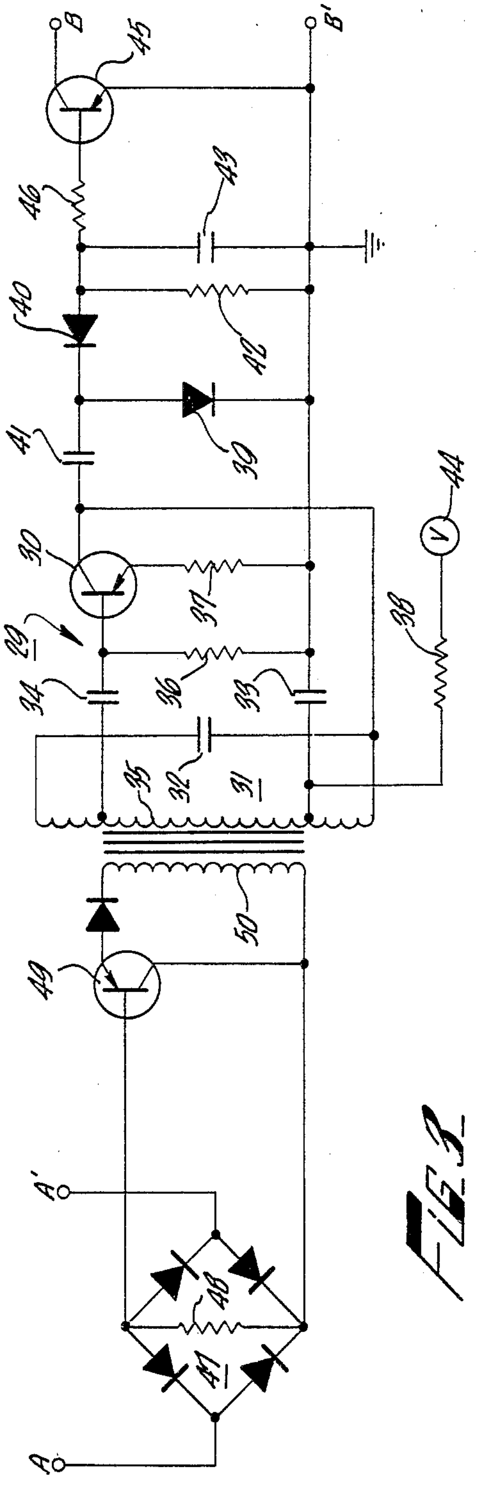
FIG. 2 is a schematic diagram, partially in block form, of a repeater employed in the telecommunication circuit of FIG. 1, which repeater includes the novel circulating current inhibiting circuit or disabling device of the present invention.

Repeater 5 of FIG. 1 is shown in detail in the schematic diagram of FIG. 2.

The two-way telecommunication circuit provides transmission in two directions, which are representatively designated east and west on FIG. 2. The signals traveling in opposite directions on the two-wire lines must be isolated in the repeated to prevent interference and distortion. Therefore, a balancing network will generally be employed to couple the incoming and outgoing signals to the repeater.

In the repeater of FIG. 2 hybrid transformers 10 and 11 are connected in balanced bridge circuits with output transformers 8 and 9, respectively, for isolation between the directions of transmission. Signals entering from the west line will pass through transformer T1 of hybrid transformer 10 to be amplified by amplifier 12. The amplified signal is then coupled through transformer winding T2 of output transformer 9 and appears at the output terminals of the east line. Similarly, signals entering from the east line are coupled through windings T3 of hybrid transformer 11 to an amplifier 13. The amplified signal thereafter is coupled by winding T4 of output transformer 8 to the output terminals of the west line. Thus, the repeater includes two separate one-way alternating-current signal paths which include amplifying means to compensate for losses in the strength of the signal in traveling over the two-way telecommunication circuit.

In most telecommunication circuits, direct-current signals are employed for ringing and activating some of the equipment. Thus, there must be a direct-current path in addition to the alternating-current paths for the information signals. The direct-current path is provided by lines 18 and 19 connected between the secondary windings of winding T4 of output transformer 8 and the secondary windings of winding T2 of output transformer 9. The direct-current path is isolated from the alternating-current path by retardation coils 20 and 21 connected in series in each of the lines 18 and 19, respectively, and by capacitors 24 and 25 connected between the split windings of windings T2 and T4, respectively.

When the two-wire circuit is being used, the equipment that is connected to the opposite ends of the two-wire lines has a certain impedance. The circuit is balanced when in the operating condition with equipment attached to the opposite ends of the lines by coupling the balancing networks 14 and 15 to two of the output terminals of transformers 10 and 11, respectively. When the circuit is in its balanced condition there is no cross-coupling between the alternating-current paths. However, whenever the equipment at one end or the other of the two-wire line is dropped from the line, the balanced condition ceases to exist. Thereafter, signals in one alternating-current path will be coupled through the windings of the hybrid transformers and output transformers to the other alternating-current path. These spurious signals will be amplified and the amplified signals will begin to circulate within the repeater between the two alternating-current paths. The repeater will go into self-oscillation or what is sometimes called the "singing" state. Because of the close proximity of the numerous other two-wire telecommunication circuits, a cross-talk condition will arise and there will be distortions in the other two-wire telecommunication circuits that might be in use. Therefore, it is desirable to inhibit the circulating current and the resultant "singing" state.

Thus, in accordance with the present invention the circulating current is inhibited and the "singing" state prevented by effectively removing one or both of the alternating-current conduction paths in which the circulating current appears. This can be advantageously done by reducing the gain of one or both the amplifiers or by disabling the amplifiers or by physically opening the circuit or alternating-current path.

The circulating current is present only when the coupling circuits of the repeater are unbalanced, which condition exists only when the two-wire line is in its idle condition. When the two-wire line is in its idle condition the equipment at one end or the other, or both ends of the line, is dropped from the line and the hybrid transformers become unbalanced. The direct-current path is also opened by the removal of the equipment and the direct current ceases to flow. Thus, the idle condition of the two-wire line is accompanied by a cessation of direct-current flow. Therefore, in accordance with the present invention, the presence or absence of direct current in the direct-current path is detected and the alternating-current paths are controlled in response to the absence of this direct current.

Resistors 22 and 23 are inserted in lines 18 and 19, respectively, to provide a means for detecting the current flow in the direct-current path. Thereupon, in accordance with the invention, the inhibiting circuit 27 is made responsive to the absence of a voltage across resistor 23 in line 19 to activate the inhibiting circuit at the proper time.

The inhibiting circuit 27 is shown in detail in the schematic diagram of FIG. 3. The inhibiting circuit 27 includes an oscillator 29 which is composed of an active element 30 and a tuned circuit 31. The tuned circuit 31 includes capacitor 32 and inductance 35, with the tuned circuit being coupled to transistor 30 by capacitors 33 and 34. Biasing for the oscillator 29 is provided by the resistors 36 and 37 and the voltage source 44 coupled to the oscillator through resistor 38 and the winding of the inductance 35.

The output of the oscillator 29 is rectified by diodes 39 and 40 through capacitor 41. The rectifier output appears across load resistor 42 and integrating capacitor 43. This voltage is applied to transistor switch 45, through resistor 46.

The inhibiting circuit 27 also includes a fullwave rectifier 47 that is responsive to the voltage across resistor 23 in the direct-current path of the two-wire system. The fullwave rectifier 47 enables the inhibiting circuit to operate no matter which direction the current is flowing in the direct-current path of the two-wire system. The output voltage of the fullwave rectifier 47 appears across resistor 48 where it is applied to a transistor switch 49.

When the equipment is dropped from one or both ends of the two-wire telecommunication circuit the direct current will cease to flow through resistors 22 and 23 shown in FIG. 2. Thus, there will be no voltage applied to transistor switch 49 through the fullwave rectifier 47. With no voltage applied to transistor switch 49 it will act as an open switch so that it will have no effect upon the oscillator 29. Thus, the oscillator 29 will produce an output voltage across resistor 42 and integrating capacitor 43 which voltage will be applied to transistor switch 45 to place it in its closed condition. Thereupon, substantially ground potential will appear at terminal B of transistor switch 45. Thus, if the inhibiting circuit 27 is connected in the repeater, as shown in FIG. 2, directly across the output of the amplifier 12, the closing of transistor switch 45 will effectively ground the output of amplifier 12 so that the circulating current will be inhibited and the "singing" state prevented. Similarly, the output of amplifier 13 may be shorted to ground to further inhibit any circulating currents.

Alternatively, the output of the inhibiting circuit could activate a switch to open the path leading to or from one or both of the amplifiers 12 and 13. By either of these methods there will no longer exist a path for circulating currents of any frequency so that "singing" and cross-talk cannot exist.

As a further alternative, the output of the inhibiting circuit or disabling device 27 could be connected to one or both of the amplifiers to reduce the gain of the amplifier below the gain required to sustain the oscillations.

Thereafter, when the two-wire line is placed in use by connecting the equipment at both ends of the line, the direct current will again flow in the direct-current path. This direct current will cause a voltage drop across resistor 23 shown in FIG. 2 which will be detected and applied to the inhibiting circuit 27. This voltage drop will cause a voltage to appear across resistor 48 at the output of the fullwave rectifier 47 which will be coupled to switch 49 to place it in its closed condition. The activation of switch 49 will effectively short coil 50 which is inductively coupled to inductance 35. The shorting of coil 50 will put a damper on oscillator 29 so that it will cease to produce an output. This removes the voltage from resistor 42 and integrating capacitor 43 and opens transistor switch 45 by removing its bias voltage. The opening of transistor switch 45 will cause a high impedance to appear between terminals B and B′ so that the inhibiting circuit will have no effect on the amplifiers in the repeater circuit and the repeater will operate in its normal manner.

What is claimed is:

1. In a two-wire transmission system having a direct-current path and an independent alternating-current path over a portion of its length, a disabling device comprising a means connected in the direct-current path for sensing the flow of direct current in the path, and a means responsive to the sensing means for preventing current flow in the alternating-current path.

2. A disabling device in accordance with claim 1 wherein the preventing means includes an oscillator having a tuned circuit, a rectifier for rectifying the output of the oscillator, and a transistor switch connected to the rectifier for disabling the alternating-current path when the oscillator is producing an output.

3. A disabling device in accordance with claim 2 wherein the sensing means includes a resistor in the direct-current path, a fullwave rectifier connected across the resistor, a second transistor switch connected across the output of the fullwave rectifier, and an inductive winding connected to the output of said second transistor switch and inductively coupled to the tuned circuit of the oscillator for shorting the tuned circuit of the oscillator to prevent oscillations when said second transistor switch is conducting.

4. In a two-wire telecommunication circuit having an active condition and an idle condition, a repeater station comprising two separate one-way alternating-current signal channels, each channel including amplifying means and carrying signals in opposite directions of transmission, a direct-current channel isolated from said alternating-current channels for conducting the direct current present on the two-wire circuit during the active condition, means coupled to said direct-current channel for detecting the idle condition, and means responsive to said detecting means for inhibiting the transmission of current through one of said alternating-current channels.

5. A repeater station in accordance with claim 4 wherein said detecting means includes a resistor in the direct-current path of said direct-current channel.

6. A repeater station in accordance with claim 4 wherein the inhibiting means includes means located in one of said alternating-current channels for effectively removing the signal path through said channel, means for controlling the removing means including a fullwave bridge circuit for detecting bidirectional current flow, a first transistor switch responsive to the output voltage of said bridge circuit, a freerunning oscillator, a rectifier in the output circuit of said oscillator for developing a direct-current signal, means for coupling said first transistor switch to said oscillator for controlling the conduction state of said oscillator, a second transistor switch coupled to said removing means for controlling said removing means, and means for coupling the output of said rectifier to said second transistor switch for making said transistor switch responsive to the conductive state of said oscillator.

7. A repeater station in accordance with claim 4, wherein the inhibiting means includes a fullwave bridge circuit for detecting bidirectional current flow in said direct-current channel, a first transistor switch responsive to the output of said bridge circuit, an oscillator, a rectifier in the output circuit of said oscillator for developing a direct-current signal, means for coupling said first transistor switch to said oscillator for controlling the conduction state of said oscillator, a second transistor switch having two output terminals, one of said output terminals being connected to ground reference and the other of said output terminals being effectively connected to ground reference through said transistor switch when said switch is in its conductive state, means for coupling the output terminals of said second transistor switch to the output terminals of the amplifying means in one of said alternating-current signal channels, and means for coupling the output of said rectifier to said second transistor switch for making said transistor switch responsive to the conductive state of said oscillator.

8. In a two-wire telecommunication circuit having an active condition and an idle condition, a repeater station comprising two separate one-way alternating-current signal channels, each channel including amplifying means and carrying signals in opposite directions of transmission, a direct-current channel isolated from said alternating-current channels for conducting the direct current present on the two-wire circuit during the active condition, means coupled to said direct-current channel for detecting the idle condition, and means responsive to said detecting means for inhibiting the transmission of current through both of said alternating-current channels during the idle condition of said two-wire circuit.

References Cited

UNITED STATES PATENTS

| | | | |
|---|---|---|---|
| 2,382,588 | 8/1945 | Thornton et al. ---- | 179—170.4 |
| 3,125,648 | 3/1964 | Eklov ------------ | 179—170.2 |

KATHLEEN H. CLAFFY, Primary Examiner

W. A. HELVESTINE, Assistant Examiner

U.S. Cl. X.R.

179—170.2

PO-1050
(5/69)

UNITED STATES PATENT OFFICE

CERTIFICATE OF CORRECTION

Patent No. 3,483,336 Dated Dec. 9, 1969

Inventor(s) WORTHINGTON C. LENT

It is certified that error appears in the above-identified patent and that said Letters Patent are hereby corrected as shown below:

Column 2, line 4, delete "service"; column 2, line 67, change "repeated" to -- repeater --.

SIGNED AND
SEALED
JUN 2 1970

(SEAL)
Attest:

Edward M. Fletcher, Jr.
Attesting Officer

WILLIAM E. SCHUYLER, JR.
Commissioner of Patents